US010959166B2

(12) United States Patent
Buckley

(10) Patent No.: US 10,959,166 B2
(45) Date of Patent: *Mar. 23, 2021

(54) APPARATUS, AND ASSOCIATED METHOD, FOR FACILITATING COMMUNICATIONS BY A MOBILE NODE IN A MULTIPLE NETWORK RADIO COMMUNICATION SYSTEM HAVING INTERWORKING CAPABILITY

(71) Applicant: BlackBerry Limited, Waterloo (CA)

(72) Inventor: Adrian Buckley, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,436

(22) Filed: Aug. 12, 2019

(65) Prior Publication Data

US 2019/0364494 A1 Nov. 28, 2019

Related U.S. Application Data

(63) Continuation of application No. 15/985,314, filed on May 21, 2018, now Pat. No. 10,383,042, which is a
(Continued)

(51) Int. Cl.
*H04W 48/16* (2009.01)
*H04W 48/18* (2009.01)
(Continued)

(52) U.S. Cl.
CPC .......... *H04W 48/16* (2013.01); *H04W 48/18* (2013.01); *H04W 8/26* (2013.01); *H04W 84/12* (2013.01); *H04W 88/06* (2013.01); *H04W 92/02* (2013.01)

(58) Field of Classification Search
CPC ... H04W 48/18; H04W 56/001; H04W 48/00; H04L 61/30; H04L 63/0414; H04L 29/06
See application file for complete search history.

(56) References Cited

U.S. PATENT DOCUMENTS 5,293,488 A 3/1994 Riley et al.
6,148,197 A 11/2000 Bridges et al.
(Continued)

FOREIGN PATENT DOCUMENTS

CA 2 500 658 4/2004
EP 1241902 9/2002
(Continued)

OTHER PUBLICATIONS

3GPP, "3GPP TS 23.234 V.6.1.0 (Jun. 2004)—3rd Generation Partnership Project; Technical Specification Group Services and System Aspects; 3GPP System to Wireless Local Area Network (WLAN) Interworking; System Description (Release 6)," Jun. 2004, (94 pages).
(Continued)

*Primary Examiner* — Iqbal Zaidi
(74) *Attorney, Agent, or Firm* — Fish & Richardson P.C.

(57) ABSTRACT

Apparatus, and an associated method, by which to permit selection by a user of a mobile node of with which cellular communication system network that the mobile node shall communicate by way of an interworking wireless local area network. User selection is provided even when the interworking wireless local area network is directly connected to the home network of the mobile node. A determiner determines whether the interworking wireless local area network is directly connected to the home network. And, responsive to the determinations, an identifier identifies the cellular communication system network associated with the interworking wireless local area network.

20 Claims, 3 Drawing Sheets

Related U.S. Application Data continuation of application No. 14/980,029, filed on Dec. 28, 2015, now Pat. No. 9,980,210, which is a continuation of application No. 11/943,267, filed on Nov. 20, 2007, now Pat. No. 9,232,463, which is a continuation of application No. 10/914,511, filed on Aug. 9, 2004, now abandoned.

(51) Int. Cl.

| | | |
|---|---|---|
| H04W 8/26 | (2009.01) | |
| H04W 84/12 | (2009.01) | |
| H04W 88/06 | (2009.01) | |
| H04W 92/02 | (2009.01) | |

(56) References Cited

U.S. PATENT DOCUMENTS

| | | |
|---|---|---|
| 6,243,581 B1 | 6/2001 | Jawanda |
| 6,636,502 B1 | 10/2003 | Lager et al. |
| 6,799,038 B2 | 9/2004 | Gopikanth |
| 6,950,655 B2 | 9/2005 | Hunkeler |
| 7,447,502 B2 | 11/2008 | Buckley et al. |
| 7,650,428 B1 | 1/2010 | Taaghol et al. |
| 7,664,495 B1 | 2/2010 | Bonner et al. |
| 7,778,637 B2 | 8/2010 | Zhang |
| 8,019,346 B2 | 9/2011 | Sachs et al. |
| 8,364,199 B2 | 1/2013 | Xue et al. |
| 2002/0085540 A1 | 7/2002 | Hyvarinen et al. |
| 2003/0134650 A1 | 7/2003 | Sundar et al. |
| 2004/0066756 A1* | 4/2004 | Ahmavaara ........... H04W 48/18 370/328 |
| 2004/0114601 A1 | 6/2004 | Watanabe et al. |
| 2005/0153684 A1 | 7/2005 | Rodrigo |
| 2006/0029027 A1 | 2/2006 | Buckley |
| 2006/0160532 A1 | 7/2006 | Buckley et al. |
| 2006/0160537 A1 | 7/2006 | Buckley et al. |
| 2006/0182245 A1 | 8/2006 | Steinmetz |
| 2006/0223498 A1 | 10/2006 | Gallagher et al. |
| 2006/0291455 A1 | 12/2006 | Katz et al. |
| 2008/0064406 A1 | 3/2008 | Buckley |
| 2008/0248747 A1 | 10/2008 | Buckley |

FOREIGN PATENT DOCUMENTS

| | | |
|---|---|---|
| GB | 2426663 | 11/2006 |
| WO | 2005/043824 | 5/2005 |
| WO | 2006/038844 | 4/2006 |

OTHER PUBLICATIONS

RIM, Network Selection Clarification, 3GPP TSG-CN1 Meeting #33bis, Mar. 30, 2004, N1-040717.
3GPP: "3GPP TS 24.234 V6.1.0 (Jun. 2004)—3rd Generation Partnership Project; Technical Specification Group Core Network; 3GPP System to WLAN Interworking; UE to network protocols; Stage 3 (Release 6); 3GPP TS 24.234 V1.5.0" Internet Citation, [Online] Jul. 2004 (Jul. 2004), XP002542506.
"3rd Generation Partnership Project; Technical Specification Group Services and System Aspects; 3GPP system to Wireless Local Area Network (WLAN) interworking; System description (Release 7); 3GPP TS 23.234 v 7.5.0" ETSI Standards, European Telecommunications Standards Institute, Sophia-Antipo, FR, No. V750, Mar. 2007 (Mar. 2007). pp. 1-85, XP002461535.
Mouly, M., et al., "Setting the Scene," 1993, GSM System for Mobile Communications, Lassay-les-Chateaux, Europe Media, FR, pp. 22-76, XP000860001.
3GPP TSG-SA2#33 Tdoc S2-032356; Source: Nortel Networks; TIM; Tille: "Network Advertisement and Selection" Sophia Antipolis, France, Jul. 7-11, 2003.
IP Australia, "Examiner's First Report," dated Nov. 22, 2006, in connection with Australian Patent Application No. 2005203536 (2 pages).
IP Australia, "Examiner's First Report," dated Jun. 20, 2008, in connection with Australian Patent Application No. 2007200785 (2 pages).
Canadian Intellectual Property Office, "Exam Report," dated May 12, 2009, in connection with Canadian Patent Application No. 2,514,711 (3 pages).
Canadian Intellectual Property Office, "Exam Report," dated Sep. 1, 2010, in connection with Canadian Patent Application No. 2,514,711 (4 pages).
Canadian Intellectual Property Office, "Exam Report," dated Apr. 21, 2011, in connection with Canadian Patent Application No. 2,514,711 (3 pages).
Canadian Intellectual Property Office, "Exam Report," dated Nov. 30, 2011, in connection with Canadian Patent Application No. 2,514,711 (3 pages).
Canadian Intellectual Property Office, "Exam Report," dated Aug. 28, 2012, in connection with Canadian Patent Application No. 2,514,711, 3 pages.
Canadian Intellectual Property Office, "Exam Report," dated Jul. 10, 2013, in connection with Canadian Patent Application No. 2,514,711, 4 pages.
State Intellectual Property Office of People's Republic of China, "First Office Action," dated Jun. 5, 2009, in connection with Chinese Patent Application No. 200510089793.X, 13 pages.
State Intellectual Property Office of People's Republic of China, "Notification of Grant of Rights for Invention Patent," dated Jan. 22, 2010, in connection with Chinese Patent Application No. 200510089793.X, 3 pages.
European Patent Office, "Search Report," dated Apr. 11, 2005, in connection with European Patent Application No. 04254792.7, 3 pages.
European Patent Office, "Communication pursuant to Article 96(2) EPC," dated Mar. 24, 2006, in connection with European Patent Application No. 04254792.7, 4 pages.
European Patent Office, "Communication under Rule 71 (3) EPC," dated Jun. 26, 2009, in connection with European Patent Application No. 04254792.7, 5 pages.
European Patent Office, "Extended European Search Report," dated Dec. 20, 2007, in connection with European Patent Application No. 07118515.1 (5 pages).
European Patent Office, "Extended European Search Report," dated Sep. 1, 2009, in connection with European Patent Application No. 09157417.8, 5 pages.
European Patent Office, "Communication pursuant to Article 94(3) EPC," dated Feb. 16, 2012, in connection with European Patent Application No. 09157417.8, 6 page.
Invitation Pursuant to Article 94(3) EPC and Rule 71(1) issued in European Application No. 09157417.8 dated Feb. 12, 2015; 4 pages.
Extended European Search Report issued in European Application No. 16179583.6 dated Feb. 8, 2017.
Communication pursuant to Article 94(3) EPC, issued in European Application No. 16179583.6 dated Jul. 2, 2018, 4 pages.
Communication pursuant to Article 94(3) EPC issued in European Application No. 16179583.6 dated Jun. 6, 2019, 5 pages.
Japanese Patent Office, "Notice of Reasons for Rejection," dated Aug. 30, 2011, in connection with Japanese Patent Application No. 2009-017371 (20 pages).
Japanese Patent Office, "Notice of Reasons for Rejection," dated Mar. 12, 2012, in connection with Japanese Patent Application No. 2009-017371 (10 pages).
Japanese Patent Office, "Notice of Final Rejection," dated Nov. 2, 2012, in connection with Japanese Patent Application No. 2009-017371 (3 pages).
Japanese Patent Office, "Notice of Reasons for Rejection," dated Aug. 6, 2008, in connection with Japanese Patent Application No. 2005-230815, 12 pages.
Japanese Patent Office, "Notice of Reasons for Rejection," dated Nov. 17, 2009, in connection with Japanese Patent Application No. 2005-230815, 4 pages.
Mexican Institute of Industrial Property, "First Office Action," dated Dec. 6, 2011, in connection with Mexican Patent Application No. MX/a/2008/002343, 3 pages.

(56) References Cited

OTHER PUBLICATIONS

Mexican Institute of Industrial Property, "Second Office Action," dated Aug. 2, 2012, in connection with Mexican Patent Application No. MX/a/2008/002343, 10 pages.

Mexican Institute of Industrial Property, "Office Action," dated Nov. 28, 2007, in connection with Mexican Patent Application No. PA/a/2005/008380, 3 pages.

Mexican Institute of Industrial Property, "Notice of Allowance," dated Apr. 3, 2008, in connection with Mexican Patent Application No. PA/a/2005/008380, 1 page.

Intellectual Property Office of Singapore, "Invitation to Respond to Written Opinion," dated Aug. 28, 2006, in connection with Singapore Patent Application No. 200504819-4, 7 pages.

Intellectual Property Office of Singapore, "Examination Report," dated Jul. 10, 2007, in connection with Singapore Patent Application No. 200504819-4, 5 pages.

United States Patent and Trademark Office, "Non-Final Office Action," dated Feb. 7, 2008, in connection with U.S. Appl. No. 10/914,511, 9 pages.

United States Patent and Trademark Office, "Non-Final Office Action," dated Aug. 11, 2008, in connection with U.S. Appl. No. 10/914,511, 11 pages.

United States Patent and Trademark Office, "Non-Final Office Action," dated Feb. 4, 2009, in connection with U.S. Appl. No. 10/914,511, 10 pages.

United States Patent and Trademark Office, "Final Office Action," dated Aug. 20, 2009, in connection with U.S. Appl. No. 10/914,511, 10 pages.

United States Patent and Trademark Office, "Non-Final Office Action," dated Dec. 29, 2009, in connection with U.S. Appl. No. 10/914,511, 14 pages.

United States Patent and Trademark Office, "Final Office Action," dated Jun. 24, 2010, in connection with U.S. Appl. No. 10/914,511, 6 pages.

United States Patent and Trademark Office, "Non-Final Office Action," dated Aug. 9, 2013, in connection with U.S. Appl. No. 10/914,511, 13 pages.

United States Patent and Trademark Office, "Non-Final Office Action," issued in connection with U.S. Appl. No. 11/943,267, dated Jun. 24, 2010, 8 pages.

United States Patent and Trademark Office, "Final Office Action," issued in connection with U.S. Appl. No. 11/943,267, dated Dec. 10, 2010, 8 pages.

United States Patent and Trademark Office, "Non-Final Office Action," issued in connection with U.S. Appl. No. 11/943,267, dated Apr. 14, 2011, 9 pages.

United States Patent and Trademark Office, "Non-Final Office Action," issued in connection with U.S. Appl. No. 11/943,267, dated Nov. 21, 2011, 10 pages.

United States Patent and Trademark Office, "Final Office Action," issued in connection with U.S. Appl. No. 11/943,267, dated Jan. 16, 2013, 10 pages.

Non-Final Office Action issued in U.S. Appl. No. 15/985,314 dated Dec. 13, 2018, 17 pages.

Notice of Allowance issued in U.S. Appl. No. 15/985,314 dated Mar. 29, 2019, 9 pages.

Communication Pursuant to Article 94(3) EPC issued in European Application No. 16179583.6 dated Apr. 23, 2020, 3 pages.

* cited by examiner

APPARATUS, AND ASSOCIATED METHOD, FOR FACILITATING COMMUNICATIONS BY A MOBILE NODE IN A MULTIPLE NETWORK RADIO COMMUNICATION SYSTEM HAVING INTERWORKING CAPABILITY

This application is a continuation of U.S. application Ser. No. 15/985,314, filed on May 21, 2018, entitled, "Apparatus, and Associated Method, for Facilitating Communications by a Mobile Node in a Multiple Network Radio Communication System Having Interworking Capability," which is a continuation of U.S. application Ser. No. 14/980,029, filed on Dec. 28, 2015, entitled, "Apparatus, and Associated Method, for Facilitating Communications by a Mobile Node in a Multiple Network Radio Communication System Having Interworking Capability,", which is a continuation of U.S. application Ser. No. 11/943,267, filed on Nov. 20, 2007, entitled, "Apparatus And Associated Method For Facilitating Communications By A Mobile Node In A Multiple Network Radio Communication System Having Interworking Capability,", which is a continuation of U.S. application Ser. No. 10/914,511, filed on Aug. 9, 2004, entitled, "Apparatus And Associated Method For Facilitating Communications By A Mobile Node In A Multiple Network Radio Communication System Having Interworking Capability." The entire contents of which are hereby expressly incorporated by reference herein in their entireties.

The present invention relates generally to a manner by which to facilitate communications by a mobile node with a selected PLMN (public land mobile network) by way of a WLAN (wireless local area network) pursuant, e.g., to interworking between a 3GPP (Third Generation Partnership Project) network and an I-WLAN (interworking-wireless local area network). More particularly, the present invention relates to apparatus, and an associated method, by which to obtain information at the mobile node of available PLMNs with which the mobile node is able to communicate, even when the WLAN is directly connected to an HPLMN that is associated with the mobile node.

A determination is made whether a WLAN, with which the mobile node is in communication connectivity, is directly connected to the HPLMN (home public land mobile network) of the mobile node. If so, the mobile node causes its authentication with the WLAN to fail, precipitating the WLAN to send PLMN information to the mobile node that identifies the PLMNs with which the mobile node is able to communicate by way of the WLAN. Automatic communication by the mobile node with the HPLMN that would otherwise result, due to the direct connection of the WLAN with the HPLMN, is avoided. Instead, the user of the mobile node is able to select with which of the available PLMNs with which the mobile node shall communicate.

BACKGROUND OF THE INVENTION

Modern communication systems have benefited from advancements in communication technologies. When implemented in existing communication systems, such advancements provide for improved communications, e.g., more efficient communication of data, communication of data at higher communication rates, or in manners that better provide for the successful communication of the data in adverse communication conditions. And, advancements in communication technologies have permitted the development of new types of communication systems, providing for the effectuation of new types of communication services. As advancements in communication technologies shall likely continue, their implementation into existing and yet other new communication systems shall likely also continue in the future.

Communication systems are regularly utilized by many, and, for many users, ready access to communicate by way of any of various communication systems is necessary. Data is communicated upon a communication system by a user both to send data to another location and to receive data that is sent from a remote location.

Advancements in digital communication technologies are amongst the technological advancements that have been implemented in communication systems. Use of digital communication techniques provides various communication advantages. For instance, improved communication efficiencies are provided as redundancies in data that is to be communicated are removed prior to communication of the data. By improving the communication efficiency, the throughput rate of the data in the communication system is increased, relative to the throughput rate permitted of a corresponding analog communication system.

A radio communication system is an exemplary type of communication system. In a radio communication system, communication stations operable therein send and receive data communicated upon radio communication channels. The radio communication channels are defined upon portions of the electromagnetic spectrum. Free of the need to interconnect communication stations by way of wireline connections, radio communication systems permit for the effectuation of communications between locations at which interconnection of communication stations by way of wireline connections would not be possible or practical. Additionally, a radio communication system is implementable as a mobile communication system providing communication mobility to the communications.

A cellular communication system is an exemplary type of radio communication system. A cellular communication system includes a network part, referred to as network infrastructure, that is installed over a geographical area that is encompassed by the communication system.

Cellular communication systems generally conform to operational parameters set forth in an operating specification. Operating specifications are promulgated by standard-setting, regulatory bodies. And, the regulatory bodies have promulgated successive generations of operating standards, each generation taking advantage of advancements in communication technologies.

The network infrastructures of more than one generation of cellular communication system might well be installed to encompass common geographical areas. And, the network infrastructures of cellular communication systems of the same generation, operated, e.g., by different network operators, might also be installed over a common geographical area.

Additionally, wireless local area networks (WLANs) have also been developed and deployed. WLANs are also radio communication systems, and such systems are operable, at least in various aspects, in manners that are analogous to operation of cellular communication systems. Wireless local area networks are generally implemented as small-area systems that encompass areas generally smaller than the areas encompassed by cellular communication systems.

Wireless local area networks, in some respects, are technological extensions of conventional local area networks. That is to say, both conventional local area networks and wireless local area networks generally provide for the communication of packet-formatted data and are generally able to effectuate data-intensive packet communication services. The mobile nodes of the wireless local area network are analogous to, and functionally equivalent to, the fixed nodes of the conventional local area network.

The communication protocols of a wireless local area network and a cellular communication system are not necessarily the same, and frequently are not, the same. Mobile nodes are sometimes constructed to be operable in both a cellular communication system and a WLAN.

When a user of the mobile node effectuates communication of data pursuant to a communication service, selection must be made of a network by way of which to communicate. Interworking between wireless local area networks and the networks of cellular communication systems is ongoing and operating protocol standards are undergoing development.

It is generally desired to permit the user of the mobile node, when in communication connectivity with a particular wireless local area network, to permit the mobile node to communicate with a cellular communication system network, if selected, and if so, further to permit the user of the mobile node to select with which cellular communication system network to communicate if more than one cellular communication system network is associated with the wireless local area network. The user of the mobile node is provided with indications of the cellular communication system networks available with which to communicate by way of the wireless local area network as a result of broadcasts of such information by the wireless local area network. The information is provided to the mobile node, e.g., pursuant to authentication procedures.

Existing procedures by which to provide the information to the user of the mobile node is susceptible to problems when the wireless local area network with which the mobile node is in the communication connectivity is directly connected to a home public land and mobile network (HPLMN) of the mobile node, as communications between the mobile node and the HPLMN are automatically effectuated. The user of the mobile node is not provided with the capability of selection of with which cellular communication system network that the mobile node shall communicate.

An improved manner by which to permit user selection even when the wireless local area network is directly connected to the HPLMN of the mobile node is therefore required.

It is in light of this background information related to communication of data in a multiple network communication system that the significant improvements of the present invention have evolved.

SUMMARY OF THE INVENTION

The present invention, accordingly, advantageously provides apparatus, and an associated method, by which to facilitate communications by a mobile node with a selected public land mobile network by way of a wireless local area network, e.g., pursuant to interworking between a 3GPP (Third Generation Partnership Project) network and an I-WLAN (interworking-wireless local area network).

Through operation of an embodiment of the present invention, a manner is provided by which to obtain information at the mobile node of available public land mobile networks with which the mobile node is able to communicate, even when the wireless local area network is directly connected to the home-public land mobile network associated with the mobile node.

In one aspect of the present invention, a determination is made whether a wireless local area network, with which the mobile node is in communication connectivity, is directly connected to the home public land mobile network of the mobile node. If so, then the mobile node causes its authentication to fail, precipitating the wireless local area network to send the public land mobile network information to the mobile node. The information identifies the public land mobile networks with which the mobile node is able to communicate by way of the wireless local area network.

Thereby, automatic communication by the mobile node with its home public land mobile network that would otherwise result due to the direct connection of the wireless local area network with the home public land mobile network is avoided. The user is provided with the information of the public land mobile networks with which communications are effectuable, and the user of the mobile node is able to make selection of with which of the available networks that communications shall be effectuated.

During operation of the mobile node, the mobile node searches for the wireless local area networks with which the mobile node is able to communicate. The search performed by the mobile node comprises, for instance, scans of frequencies at which access points, or other structure, of wireless local area networks that broadcast signals that identify their presence. When the mobile node detects a wireless local area network that is permitting of communication connectivity with the mobile node, the mobile node commences procedures by which to permit communication between the mobile node and the selected wireless local area network. The mobile node includes, for instance, a list that identifies preferred wireless local area networks with which the communications are preferred over networks not contained on the lists.

In one implementation, the mobile node also includes a list that identifies cellular communication system networks that are associated with wireless local area networks. When the mobile node detects wireless local area networks with which the mobile node is able to enter into communication connectivity, the list is accessed to determine whether a cellular communication system network associated therewith is a home network associated with the mobile node. The list further indicates which of the cellular communication system networks are directly connected to the associated wireless local area network.

Responsive to access to the list, or otherwise, a determination is made as to whether the selected wireless local area network is directly connected to the home network associated with the mobile node. If the wireless local area network is directly connected to the home network of the mobile node, the mobile node initiates an authentication procedure that causes the mobile node to fail its authentication. Upon failure of the authentication, the wireless local area network provides a list to the mobile node of the cellular communication system networks, i.e., the PLMNs, that are associated with the wireless local area network and with which the mobile node is able to communicate through its communication connection with the wireless local area network.

In the exemplary implementation, the mobile node performs authentication procedures with a root network address identifier (NAI) that is of a value other than the value of the root network address identifier that would properly authenticate the mobile node. The other value is stored, for instance, at the mobile node, and the value is retrieved when a determination is made that the selected wireless local area network maintains a direct connection with the home network associated with the mobile node. By sending the root network address identifier of the other value, authentication fails. And, the wireless local area network, pursuant to the authentication failure, provides the mobile node with indications of which cellular communication system networks are accessible by way of the wireless local area network. Thereby, a user of the mobile node is provided with indications of the available cellular communication system networks, permitting the user to make selection of with which of the cellular communication system networks that with which communications shall be effectuated by way of the selected wireless local area network.

In these and other aspects, therefore, apparatus, and an associated method, is provided for a mobile node selectably operable to communicate in a multi-network communication system. The communication system has a first set of first type networks and a second set of second type networks. The mobile node is associated with a home network comprises of a second type network of the second set. Communication by the mobile node, once connected in communication connectivity with a first type network of the first set, with a selected network of the second set is facilitated. A determiner is adapted to receive indications of a direct connection between the network of the first set with which the mobile node is connected in the communication connectivity and the home network associated with the mobile node. The determiner determines if the network of the first set with which the mobile node is connected in the communication connectivity is directly connected with the home network. An identifier is operable at least responsive to determination by the determiner of the direct connection between the first network and the home network. The identifier identifies which, if any, of the networks of the second set of networks are available with which to communicate with the mobile node.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
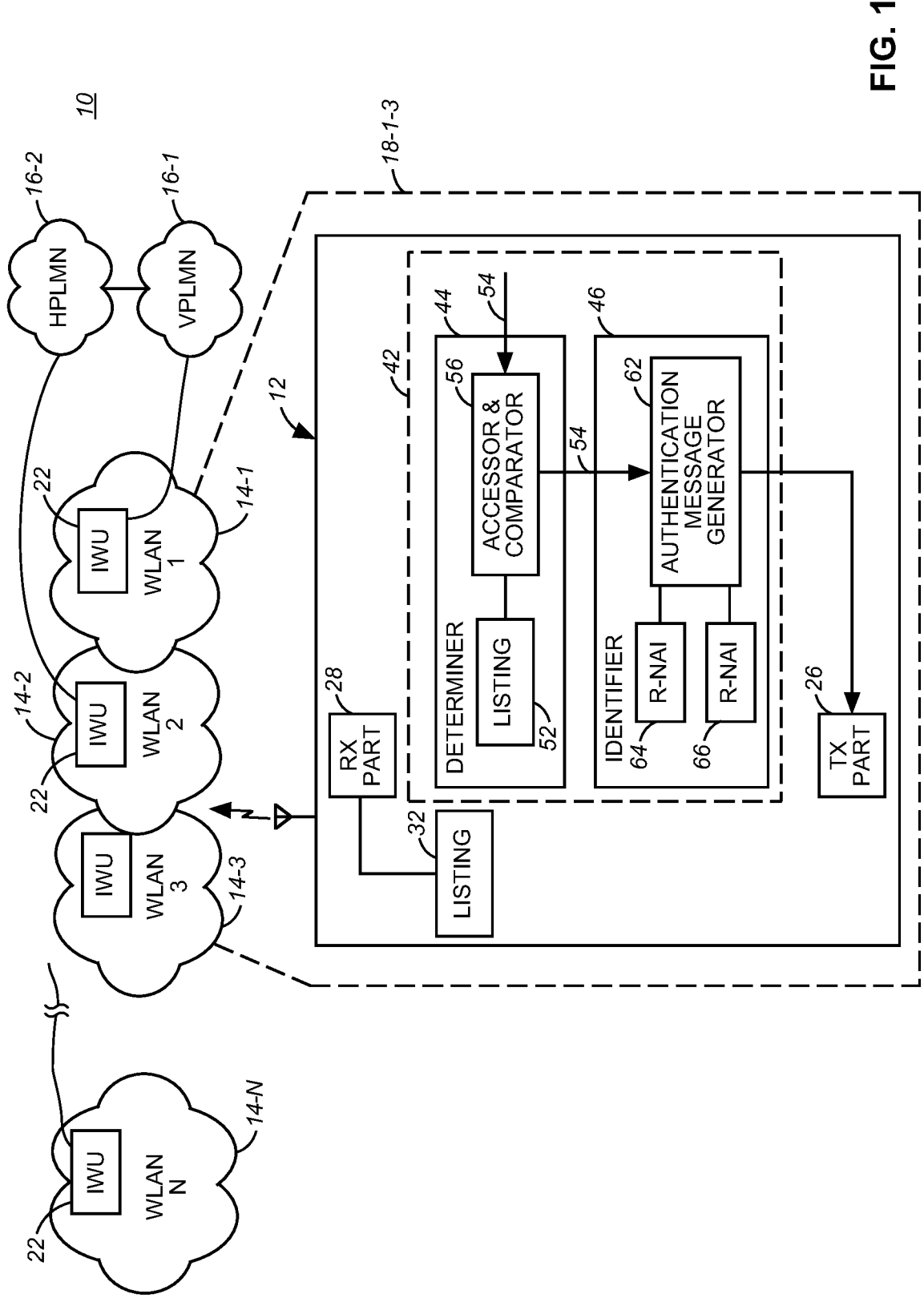
FIG. 1 illustrates a functional block representation of a multiple network communication system in which an embodiment of the present invention is operable.

Referring first to FIG. 1, a communication system, shown generally at 10, provides for radio communications with mobile nodes, which the mobile node 12 is representative. The mobile node forms a dual-mode, mobile node capable of operation in a first manner and at least a second manner. In the exemplary implementation, the mobile node is separately operable pursuant to an IEEE 802.11(b), or variant, operating specification, and a 3GPP (Third Generation Partnership Project) operating standard. In other implementations, the mobile node is operable pursuant to other operating standards. Accordingly, while the following description of exemplary operation of an embodiment of the present invention shall be described with respect to its implementation in which the data is communicated pursuant to the operating protocols of the IEEE 802.11(b) and 3GPP operating specifications, operation of an embodiment of the present invention is analogously also operable in communication systems operable pursuant to other operating standards. The following description of exemplary operation is, therefore, by way of example not by way of limitation.

The communication system includes network infrastructure, here formed of multiple networks. Some of the networks are operable pursuant to a wireless local area network operating standard, here the IEEE 802.11(b) operating standard, and others are operable pursuant to a cellular communication system operating standard, here a 3GPP operating standard. In the exemplary representation of the figure, four wireless local area networks 14 are shown, and two cellular communication system networks 16 are shown. Three of the wireless local area networks 14, networks 14-1, 14-2, and 14-3, are deployed in manners that encompass a common area, here identified by the cell 18-1-3. And, an additional wireless local area network 14-N is also shown, here representative of a wireless local area network that encompasses another area, represented by the cell 18-N. The wireless local area networks 14 each include interworking units (IWUs) 22 that facilitate interworking between the wireless local area networks and cellular communication system networks, here the cellular communication system networks 16. The wireless local area network 14-1 is directly connected to the cellular system network 16-1. And, the wireless local area network 14-2 is directly connected to the cellular system network 16-2. The networks 16-1 and 16-2 are connected. And, thereby, the wireless local area network 14-1 is also indirectly connected to the cellular system network 16-2. And, also, the wireless local area network 14-2 is indirectly connected to the cellular system network 16-1.

The mobile node 12 is operable, as noted above, pursuant to the operating standards by which the wireless local area networks and the cellular system networks are operable. The mobile node includes transceiver circuitry, here represented by a transmit part 26 and a receive part 28. The transceiver circuitry is operable in conventional manner, operating pursuant to the protocols set forth in the operating specifications, to form communication connections with, and effectuate communication of data with selected networks in whose coverage areas that the mobile node is positioned, by way of a radio air interface.

Positioned as shown in the figure, the mobile node is positioned within the coverage areas of the wireless local area networks 14-1, 14-2, and 14-3. When the mobile node initiates communications, the mobile node scans for the availability of the wireless local area networks by scanning channels upon which signals are broadcast by such networks. The mobile node, in the exemplary implementation, includes a WLAN scan list 32 that identifies WLANs with which the mobile node is permitted to attempt to communicate. The lists identify, for instance, the frequencies at which the listed wireless local area networks broadcast control, or other, information. Pursuant to interworking between the networks, the mobile node is capable of communicating, by way of a wireless local area network, with a cellular system network, viz., a communication station that is coupled to the communication system network. The mobile node is permitted communication with a cellular system network pursuant, e.g., a service subscription. Pursuant to the service subscription, a home network is associated with the mobile node, typically a network in whose coverage area that the mobile node is most regularly positioned. Here, the network that forms the home network of the mobile node 12 is the network 16-2, identified as the HPLMN (Home Public Land Mobile Network) associated with the mobile node. Other cellular system networks, not the home network associated with the mobile node, are referred to as visited networks. Here, the network 16-1, identified as a VPLMN (Visited Public Land Mobile Network).

As noted previously, interworking between the networks 14 and 16 conventionally provides for notification to the mobile node, once in communication connectivity with a wireless local area network, of the cellular system networks with which the wireless local area network maintains associations. When the information is delivered to the mobile node, a user of the mobile node is able to select with which of the cellular system networks, if any, to effectuate communications. Pursuant to existing proposals and practice, the mobile node is provided with the information regarding the associated cellular communication system networks pursuant to association procedures in which the mobile node attempts authentication with a selected wireless local area network. The authentication attempt fails, and pursuant to the failure of the authentication, the mobile node is provided with the indications of the cellular communication system networks with which the wireless local area network is associated. However, when the wireless local area network is in direct connection with the home cellular communication system network associated with the mobile node, the mobile node is not provided with the associated networks to permit a user of the mobile node to select with which of the cellular communication system networks with which to communicate. Existing operation, therefore, limits the ability of a user of the mobile node to select with which cellular communication system network to communicate when the wireless local area network is directly connected to the home network of the mobile node.

Pursuant to operation of an embodiment of the present invention, a manner is provided by which to provide user selection of the cellular communication system network with which to communicate even when the wireless local area network with which the mobile node is associated in communication connectivity is directly connected to the home cellular communication system network of the mobile node. The user of the mobile node is thereby provided opportunity to select with which of the available cellular communication system networks to communicate irrespective of whether the home network of the mobile node is directly connected to the wireless local area network with which the mobile node is associated in the communication connectivity.

The mobile node further includes apparatus 42 of an embodiment of the present invention. The apparatus 42 is formed of functional entities, implementable in any desired manner, including, for instance, algorithms executable by processing circuitry.

The apparatus includes a determiner 44 that operates to determine whether the wireless local area network with which the mobile node is in communication connectivity is directly connected to the home cellular communication system network associated with the mobile node. And, the apparatus includes an identifier that identifies which, if any, of the wireless local area networks to which the mobile node is in the communication connectivity is available with which to communicate with the mobile node. The identifier is operable, at least responsive to determinations made by the determiner, here indicated to be provided to the identifier by way of the line 48.

In the exemplary implementation, the determiner includes a direct connection listing 52 that is formed of entries that identify wireless local area networks, such as by their SSID (Service Set Identifier) values and, associated with each entry, an indication of whether the wireless local area network is directly connected to the home cellular communication system network associated with the mobile node. The listing is permanently stored at the mobile node, provided thereto, e.g., during initial provisioning of the mobile node. In one implementation, the listing is updatable to update the identifications of direct connections with the entries forming the listing as well as to add, or to remove, entries from the listing. In another exemplary implementation, the listing 52 identifies home WLANs.

The determiner receives indications of the wireless local area network with which the mobile node is in communication connectivity, here indicated on the line 54, and the indications are provided to an accessor and comparator 56. The indications provided on the line 54 are provided, for instance, by the receive part of the mobile node based upon detection of information broadcast by the wireless local area networks listed on the WLAN scan list 32.

The accessor and comparator 56 accesses the listing 52 and compares values stored thereat with the indications provided on the line 54. Responsive to the comparison, a determination is made as to whether the indication delivered on the line 54 corresponds to an entry on the listing 52 that identifies that the network identified in the entry is directly connected to the home network associated with the mobile node.

Results of the comparison are provided on the line 48 to the identifier that, in the exemplary implementation, includes an authentication message generator 62. The identifier also includes memory elements that store values of root network address identifiers (RNAIs). The root network address identifier stored at the memory element 64 is of a value that correctly identifies the home cellular communication system network associated with the mobile node. And, the value stored at the memory element 66 is of a different value, i.e., a value that incorrectly, or erroneously, identifies the home network. In other words, the different value is an alternative value.

In an alternate implementation, the different value of the network address identifier is randomly generated and the memory element 66 is substituted with a random value generator.

When the indications provided on the line 48 identify that the WLAN with which the mobile node is in communication connectivity does not have a direct connection to the home network associated with the mobile node, the root NAI associated with the home network, stored at the memory element 64 is retrieved, and used by the authentication message generator pursuant to authentication procedures. If, however, the determiner determines that the WLAN is directly connected to the home network associated with the mobile node, the value of the network address identifier is retrieved from the memory element 66. And, the authentication message generator uses this value pursuant to authentication procedures. Authentication fails when the correct network address identifier is used but the WLAN is not directly connected to the home network of the mobile node. And, when the WLAN is directly connected to the home network, the erroneous network address identifier causes the authentication to fail. In another implementation, the alternative value, stored at the memory element 66 is always utilized irrespective of whether the WLAN is directly connected with the home network of the mobile node. Here, also, authentication fails. And, determinations made by the determiner are obviated. Responsive to failed authentication, the WLAN sends a message to the mobile node that includes identification of the cellular communication system networks with which the WLAN maintains an association. And a user of the mobile node is able to select from the returned identifications with which of the cellular communication system networks that the mobile node shall subsequently communicate.

In an alternate implementation, a list is maintained at the mobile node of known WLANs and their respective associations of PLMNs. When a WLAN noted on the list is located, the authentication procedure that is used to obtain information regarding the cellular system networks associated with the WLAN is not performed, and HPLMN information stored at the list is provided to the user of the mobile node. And, authentication procedures using an other NAI is not required to obtain the information regarding the cellular system networks associated with the WLAN.

FIG. 2 illustrates a representation of the direct connection listing 52 that forms part of the apparatus 42 embodied at the mobile node 12 (shown in FIG. 1). The listing is exemplary and is here shown to be formed of a plurality of entries 72. With respect to the exemplary communication system shown in FIG. 1, four entries, associated with the wireless local area networks 1, 2, 3, and N, form the listing. Each entry is identified in a first column 76 by a service set identifier (SSID) that identifies each of the wireless local area networks. And, an indication is noted in the column 78 indexed together with the service set identifier of the WLAN with which it is associated. Here, the SSID of the second WLAN 14-2 is directly connected to the home network associated with the mobile node. And, the column 78 includes an indication of the direct connection.

Figures 2A, 2B:
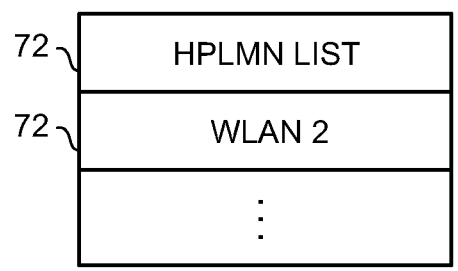
FIGS. 2A and 2B illustrate representations of a listing maintained at the mobile node that identifies wireless local area networks and whether such wireless local area networks maintain direct connections with a home network associated with the mobile node.

FIG. 2B illustrates a listing 52 that is embodied at the mobile node 12 pursuant to a further embodiment of the present invention. Here, the entries include an entry 72 identified as WLAN 2, viz., the WLAN 14-2 shown in FIG. 1. Here, the inclusion of the WLAN 2 in the listing identifies the WLAN to have a direct connection with the HPLMN of the mobile node.

Figure 3:
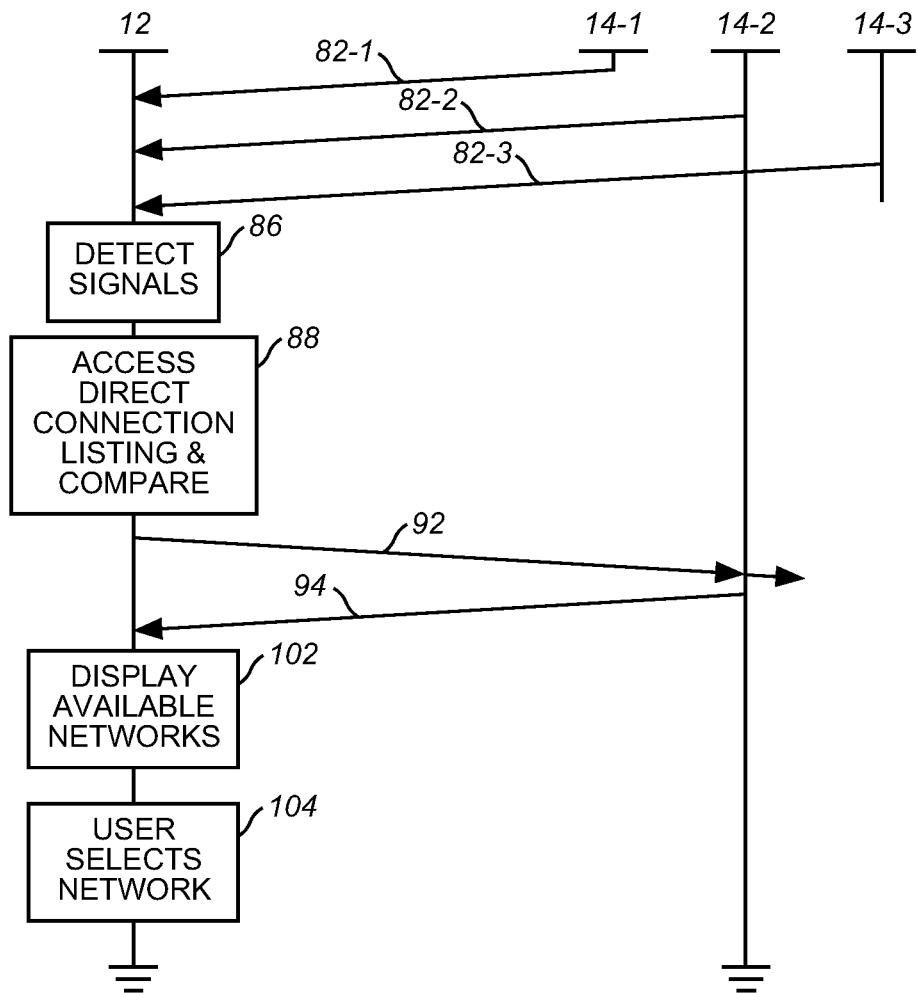
FIG. 3 illustrates a message sequence diagram representative of signaling generated during exemplary operation of the communication system shown in FIG. 1 pursuant to an embodiment of the present invention.

FIG. 3 illustrates a message sequence diagram representative of exemplary operation of the communication system 10 shown in FIG. 1. Here, the wireless local area networks 14-1, 14-2, and 14-3 broadcast signals that are detected by the mobile node. The signals are indicated in the figures by the segments 82-1, 82-2, and 82-3. The mobile node accesses its WLAN scan list 32 (shown in FIG. 1) to determine to which channels to tune. And, by tuning to the identified channels, the mobile node detects, indicated by the block 86, the transmitted signals.

The mobile node accesses the direct connection listing (shown in FIG. 1). Here, accessing and comparing is performed, as indicated by the block 88. Responsive to the comparisons, determinations are made as to whether the wireless local area network with which the mobile node is in communication connectivity, here selected to be the wireless local area network 14-2, an authentication message is generated and sent thereto, indicated by the segment 92. Because the network 14-2 is directly connected to the network 16-2, here the home network associated with the mobile node, the authentication fails. An authentication failure response 94 is provided to the mobile node together with indications of the networks with which the network 14-2 maintains associations. Once received at the mobile node, the indications of the available networks are displayed, indicated by the block 102, to the user of the mobile node, and, as indicated by the block 104, the user selects with which of the available networks that the mobile node shall communicate.

Figure 4:
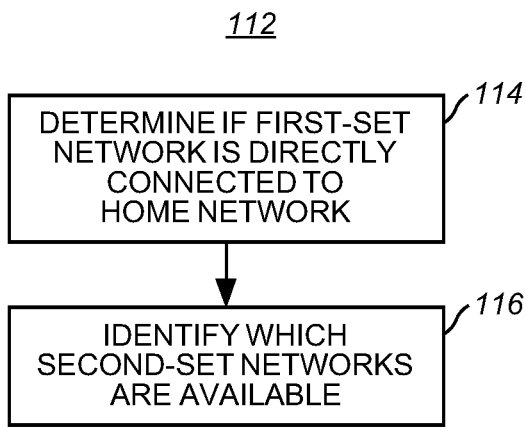
FIG. 4 illustrates a method flow diagram listing the method of operation of an embodiment of the present invention.

FIG. 4 illustrates a method, shown generally at 112, representative of the method of operation of an embodiment of the present invention. The method facilitates communications of a mobile node in a multi-network communication system having a first set of first type networks and a second set of second type networks. The mobile node is associated with a home network comprised of a second type network of the second set. The method facilitates communications by the mobile node, once the mobile node is connected in communication connectivity with a first type network of the first set, with a selected network of the second set.

First, and as indicated by the block 114, a determination is made if the network of the first set with which the mobile node is connected in the communication connectivity is directly connected with the home network.

Then, as indicated by the block 116, identification is made of which, if any, of the networks of the second set of networks are available with which to communicate with the mobile node.

Thereby, through operation of an embodiment of the present invention, a manner is provided by which to permit a user of a mobile node to select the cellular communication system network with which the mobile node shall communicate. Selection is possible irrespective of whether the home network associated with the mobile node is directly connected to the wireless local area network through which the mobile node communicates.

The previous descriptions are of preferred examples for implementing the invention, and the scope of the invention should not necessarily be limited by this description. The scope of the present invention is defined by the following claims.

The invention claimed is:

1. A method, comprising:
   sending, from a mobile node to a wireless local area network (WLAN), a message comprising an alternative network address identifier (NAI), the alternative NAI being different than a root NAI, wherein the root NAI identifies a home cellular communication system network associated with the mobile node, and the alternative NAI is selected by the mobile node to incorrectly identify the home cellular communication system network; and
   receiving, from the WLAN and in response to the message comprising the alternative NAI, a list that identifies a public land mobile network (PLMN) accessible via the WLAN.

2. The method of claim 1, further comprising providing an indication, at the mobile node, of an accessible PLMN.

3. The method of claim 1, further comprising generating the message comprising the alternative NAI.

4. The method of claim 1, wherein the WLAN is an interworking-WLAN (I-WLAN).

5. The method of claim 1, wherein the home cellular communication system network is a home PLMN.

6. The method of claim 1, further comprising selecting a PLMN from the list.

7. The method of claim 6, further comprising communicating with the selected PLMN.

8. A mobile node, comprising:
a memory; and
at least one hardware processor communicatively coupled with the memory and configured to:
send, from the mobile node to a wireless local area network (WLAN), a message comprising an alternative network address identifier (NAI), the alternative NAI being different than a root NAI, wherein the root NAI identifies a home cellular communication system network associated with the mobile node, and the alternative NAI is selected by the mobile node to incorrectly identify the home cellular communication system network; and
receive, from the WLAN and in response to the message comprising the alternative NAI, a list that identifies a public land mobile network (PLMN) accessible via the WLAN.

9. The mobile node of claim 8, wherein the at least one hardware processor is further configured to provide an indication, at the mobile node, of an accessible PLMN.

10. The mobile node of claim 8, wherein the at least one hardware processor is further configured to generate the message comprising the alternative NAI.

11. The mobile node of claim 8, wherein the WLAN is an interworking-WLAN (I-WLAN).

12. The mobile node of claim 8, wherein the home cellular communication system network is a home PLMN.

13. The mobile node of claim 8, wherein the at least one hardware processor is further configured to select a PLMN from the list.

14. The mobile node of claim 13, wherein the at least one hardware processor is further configured to communicate with the selected PLMN.

15. A non-transitory computer-readable medium containing instructions which, when executed, cause a computing device to perform operations comprising:
sending, from a mobile node to a wireless local area network (WLAN), a message comprising an alternative network address identifier (NAI), the alternative NAI being different than a root NAI, wherein the root NAI identifies a home cellular communication system network associated with the mobile node, and the alternative NAI is selected by the mobile node to incorrectly identify the home cellular communication system network; and
receiving, from the WLAN and in response to the message comprising the alternative NAI, a list that identifies a public land mobile network (PLMN) accessible via the WLAN.

16. The non-transitory computer-readable medium of claim 15, the operations further comprising providing an indication, at the mobile node, of an accessible PLMN.

17. The non-transitory computer-readable medium of claim 15, the operations further comprising generating the message comprising the alternative NAI.

18. The non-transitory computer-readable medium of claim 15, wherein the WLAN is an interworking-WLAN (I-WLAN).

19. The non-transitory computer-readable medium of claim 15, wherein the home cellular communication system network is a home PLMN.

20. The non-transitory computer-readable medium of claim 15, the operations further comprising selecting a PLMN from the list.

* * * * *